(12) United States Patent
Gayal et al.

(10) Patent No.: US 9,171,331 B1
(45) Date of Patent: Oct. 27, 2015

(54) COMMERCIAL CARD PACKET (71) Applicant: Bank of America Corporation, Charlotte, NC (US)

(72) Inventors: Nirmala Gayal, Gurgaon (IN); Rahul Mahajan, Gurgaon (IN); Raghavendran Narasimhan, Hyderabad (IN); Venkatesh Naidu, Hyderabad (IN); Neha Chaudhary, Delhi (IN); Gunveen Singh, Delhi (IN); Gurdeep Kaur, Gurgaon (IN); Kapil Jaggi, Gurgaon (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/338,990

(22) Filed: Jul. 23, 2014

(51) Int. Cl.
*G06Q 40/02* (2012.01)
*G06F 17/24* (2006.01)
*G06F 3/0484* (2013.01)

(52) U.S. Cl.
CPC ............ *G06Q 40/02* (2013.01); *G06F 3/04842* (2013.01); *G06F 17/243* (2013.01)

(58) Field of Classification Search
CPC ..... G06Q 40/02; G06Q 40/025; G06F 17/243
See application file for complete search history.

(56) References Cited

U.S. PATENT DOCUMENTS

2003/0225692 A1* 12/2003 Bosch et al. .................... 705/42
2004/0054619 A1* 3/2004 Watson et al. .................. 705/38

* cited by examiner

*Primary Examiner* — Christopher Stanford
(74) *Attorney, Agent, or Firm* — Michael A. Springs; Moore & Van Allen PLLC; Anup Shrinivasan (57) ABSTRACT

The present invention is directed to a commercial card packet form system that enables one or more users associated with a financial institution to input information associated with a customer to whom a commercial card (e.g., a purchase card, a travel card, a debit card, a credit card, a temporary card) is being issued. Each user may be granted or denied access to particular fields of information on the commercial card packet form depending on her or his role at the financial institution. The packet form may require reentry of information or user authentication to ensure accuracy of information. Pop-up warnings may alert the one or more users of potentially incomplete fields of information and instruct the one or more users to provide additional information. An audit trail may track updates to information and includes a timestamp and details associated with the user who made the updates.

16 Claims, 4 Drawing Sheets

FIGURE 1

| KEY: | REQUIRED | OPTIONAL |

COMPANY INFORMATION

| LEGAL NAME OF COMPANY | COMPANY NAME | HOW WOULD YOU LIKE YOUR CARDS SHIPPED? |
|---|---|---|
| STATEMENT ADDRESS | BULK SHIP ADDRESS | |
| PLEASE SELECT YOUR ORGANIZATION TYPE: ☐ C-CORPORATION ☐ S-CORPORATION ☐ SOLE PROPRIETORSHIP ☐ NOT FOR PROFIT ☐ LIMITED LIABILITY PARTNERSHIP ☐ GOVERNMENT/MUNICIPALITY ☐ PARTNERSHIP ☐ LIMITED LIABILITY COMPANY ☐ OTHER | | ☐ DIRECT TO CARDHOLDERS ☐ BULK SHIP TO BULK SHIP ADDRESS ☐ BULK SHIP TO STATEMENT ADDRESS ☐ OVERNIGHT |
| | | COMPANY TAX ID# XXXXXXX |
| | | WHAT IS YOUR COMPANY'S ANNUAL SPEND TARGET FOR THE CARD PROGRAM? $XXX,XXX.XX |
| | | WILL THIS COMMERCIAL CARD PROGRAM REPLACE AN EXISTING CARD PROGRAM? ☐ YES ☐ NO |
| DOES YOUR COMPANY WANT TO EMBED FOREIGN TRANSACTION FEES WITH THE CORRESPONDING TRANSACTION OR BREAK THE FEE OUT IN A SEPARATE TRANSACTION? ☐ BREAKOUT ☐ EMBED | | DOES YOUR COMPANY PLAN TO UTILIZE FLEET CARDS? ☐ YES ☐ NO |
| | | DO YOUR COMPANY EXECUTIVES WANT UP TO 10 EXECUTIVE CARDS AT NO COST? ☐ YES ☐ NO |
| DOES YOUR COMPANY WISH TO PARTICIPATE IN ONE OF THE FOLLOWING PROGRAMS? ☐ EXTRA PROGRAM WITH UNLIMITED POINTS – SEPARATE TERMS AND CONDITIONS ☐ ANNUAL CASH INCENTIVE TIRED REBATE PROGRAM ☐ NONE | | SELECT YOUR CARD DESIGN: ☐ STANDARD CARD ☐ YOUR COMPANY LOGO IN A SINGLE COLOR ☐ CUSTOM CARD – MULTIPLE COLORS |

CARD MANAGEMENT AND REPORTING OPTIONS: SELECT ALL THAT APPLY.
☐ GLOBAL REPORTING AND ACCOUNT MANAGEMENT
　　☐ BASIC EXPENSE REPORTING　　☐ MULTIPLE ORGANIZATION LEVELS OR HIERARCHIES
　　☐ COST ALLOCATION
　　☐ ENHANCED DATA　　☐ OTHER

| KEY: | REQUIRED | OPTIONAL |

COMPANY INFORMATION

| LEGAL NAME OF COMPANY | COMPANY NAME | HOW WOULD YOU LIKE YOUR CARDS SHIPPED? |

STATEMENT ADDRESS | BULK SHIP ADDRESS

PLEASE SELECT YOUR ORGANIZATION TYPE:
☐ C-CORPORATION
☐ S-CORPORATION
☐ SOLE PROPRIETORSHIP
☐ NOT FOR PROFIT
☐ LIMITED LIABILITY PARTNERSHIP
☐ GOVERNMENT/MUNICI
☐ PARTNERSHIP
☐ LIMITED LIABILITY CO
☐ OTHER

☐ DIRECT TO CARDHOLDERS
☐ BULK SHIP TO BULK SHIP ADDRESS
☐ BULK SHIP TO STATEMENT ADDRESS
☐ OVERNIGHT

COMPANY TAX ID# [ XXXXXXX ]

WHAT IS YOUR COMPANY'S ANNUAL ... FOR THE CARD
$XXX,XXX.XX

---

300

PLEASE UPDATE FIELD

COMPANY TAX ID# (REQUIRED)

OK

---

MERCIAL CARD
LACE AN EXISTING
M? ☐ YES ☐ NO

DOES YOUR COMPANY W
FOREIGN TRANSACTION
CORRESPONDING TRANS
THE FEE OUT IN A SEPAR
☐ BREAKOUT

OMPANY PLAN TO
CARDS? ☐ YES ☐ NO

DO YOUR COMPANY EXECUTIVES
WANT UP TO 10 EXECUTIVE CARDS AT
NO COST? ☐ YES ☐ NO

DOES YOUR COMPANY WISH TO PARTICIPATE IN ONE OF THE FOLLOWING PROGRAMS?
☐ EXTRA PROGRAM WITH UNLIMITED POINTS – SEPARATE TERMS AND CONDITIONS
☐ ANNUAL CASH INCENTIVE TIRED REBATE PROGRAM
☐ NONE

SELECT YOUR CARD DESIGN:
☐ STANDARD CARD
☐ YOUR COMPANY LOGO IN A SINGLE COLOR
☐ CUSTOM CARD – MULTIPLE COLORS

CARD MANAGEMENT AND REPORTING OPTIONS: SELECT ALL THAT APPLY.
☐ GLOBAL REPORTING AND ACCOUNT MANAGEMENT
   ☐ BASIC EXPENSE REPORTING       ☐ MULTIPLE ORGANIZATION LEVELS OR
   ☐ COST ALLOCATION                  HIERARCHIES
   ☐ ENHANCED DATA                 ☐ OTHER

COMMERCIAL CARD PACKET

FIELD OF THE INVENTION

The present invention embraces a system for ensuring accuracy of inputted information into a commercial card packet form system. The system typically includes a processor, a memory, and a module stored in the memory. The module is typically configured to initiate presentation of a first interface that enables a user to input information associated with issuing a card to a customer, receive from the user information associated with issuing the card to the customer, determine at least one error in the information associated with issuing a card received from the user, and initiate presentation of a second interface identifying the at least one error in the information.

BACKGROUND

When issuing a financial card to a customer, information must be inputted into a form system for processing. Multiple employees are often required to input information into the form system, and so there are many opportunities for information discrepancy. Therefore, there is a need for improved ways of ensuring accurate information is inputted in a complete manner.

BRIEF SUMMARY

The present invention is directed to a commercial card packet form system—a software-based system that enables one or more users (e.g., associates associated with a financial institution) to input information into a commercial card packet form associated with a customer to whom a card (e.g., a commercial card, a purchase card, a travel card, a debit card, a credit card, a temporary card, or the like) is being issued. Each user is granted or denied access to particular fields of information on the commercial card packet form depending on his role at the financial institution. The packet form system may require reentry of inputted information or user authentication to ensure accuracy of information. Pop-up warnings or alert windows alert the one or more users of potentially incomplete fields of information and instruct the one or more users to provide additional information. An audit trail tracks updates to information and includes a timestamp and details associated with the user who made the updates.

In some embodiments, a system is provided. The system comprises: a memory; a processor; and a module stored in memory, executable by a processor, and configured to: initiate presentation of a first interface on a user device (e.g., a computing device, personal computer, workstation, mobile device, or the like) that enables a user to input information associated with issuing a card to a customer; receive from the user device information associated with issuing the card to the customer; determine at least one error in the information associated with issuing a card received from the user device; and initiate presentation of a second interface identifying the at least one error in the information on the user device.

In some embodiments, the first interface comprises a form comprising a plurality of information fields, wherein receiving the information from the user device comprises populating the plurality of information fields with the information received from the user device.

In some embodiments, the plurality of information fields include at least one information field that is not accessible by the user based on a determination of a user type associated with the user.

In some embodiments, information associated with issuing the card to the customer comprises at least one of a customer name, a customer address, a company name, a company address, an organization type, a preferred shipment method, an annual spend target, a preferred card design, a spending limit, an approved credit line, or a risk rating.

In some embodiments, the card comprises at least one of a commercial card, a purchase card, a travel card, a debit card, a credit card, or a temporary card, wherein the card is associated with a financial account.

In some embodiments, the at least one error comprises at least one of a spelling error, missing information, incomplete information, a numerical value outside of a predetermined range, or an inconsistency of information.

In some embodiments, determining the at least one error comprises: comparing the information received from the user device to information previously inputted into the first interface; and determining that the information received from the user device does not match information previously inputted into the first interface.

In some embodiments, the second interface enables the user to input information associated with issuing the card to the customer.

In some embodiments, the module is further configured to generate an audit trail, wherein the audit trail includes at least one of a timestamp, a datestamp, a user name, a user identification (ID), information associated with the user, an identified error in the information associated with issuing the card to customer, or an identified change made to the information associated with issuing the card to the customer.

In some embodiments, the module is further configured to generate a report, wherein the report includes at least one of information associated with issuing the card to the customer, the audit trail, or information associated with the user, wherein the report is at least one of a message, an email, a notification, a workbook, or a document.

In some embodiments, the module is further configured to transmit the report to at least one apparatus associated with at least one second user.

In some embodiments, the module is further configured to authenticate the user, wherein authenticating the user comprises: prompting, via the second interface, the user for at least one authentication credential; receiving from the user device at least one authentication credential; comparing the at least one authentication credential received from the user device to a plurality of authentication credentials stored in a database and associated with authentication of the user; and determining at least a partial match between the at least one authentication credential received from the user and an authentication credential in the plurality of authentication credentials associated with authentication of the user.

In some embodiments, the user is enabled to input information associated with issuing the card to the customer in response to being authenticated.

In some embodiments, the module is further configured to back up the information associated with issuing the card to the customer by storing the information associated with issuing the card to the customer in a database.

In some embodiments, the user is prompted by the module and is required to input information associated with issuing the card to the customer twice, wherein twice-input information includes a first input of information and a confirmation of the first input of information.

In some embodiments, the module is further configured to provide suggestions to the user via the second interface for correcting the identified at least one error.

In some embodiments, a method is provided. The method comprises: initiating, via a computing device processor, presentation of a first interface on a user device that enables a user to input information associated with issuing a commercial card to a customer; receiving, via a computing device processor, from the user device information associated with issuing the commercial card to the customer; determining, via a computing device processor, at least one error in the information associated with issuing a commercial card received from the user device; and initiating, via a computing device processor, presentation of a second interface identifying the at least one error in the information on the user device.

In some embodiments, a computer program product is provided. The computer program product comprises a non-transitory computer-readable medium comprising code causing an apparatus to: initiate presentation of a first interface on a user device that enables a user to input information associated with issuing a card to a customer; receive from the user device information associated with issuing the card to the customer; determine at least one error in the information associated with issuing a card received from the user device; and initiate presentation of a second interface identifying the at least one error in the information on the user device.

The commercial card packet form system of the present invention provides many benefits. First, the system provides a solution for increasing accuracy of inputted information associated with a customer to whom a card is being issued. Thus, the system reduces the amount of time required for reviewing, revising, and updating missing, incorrect, or incomplete information. Additionally, the system eliminates discrepancies in inputted information by locking and unlocking access on a per-user basis and by categorizing information as mandatory for completion and issuance of the card to the customer. All in all, the system reduces financial loss to a financial institution and enables the financial institution to provide a substantially higher level of customer service to the customer during card issuance.

BRIEF DESCRIPTION OF THE DRAWINGS

Having thus described embodiments of the invention in general terms, reference will now be made to the accompanying drawings, where:

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may not be a financial institution.

In some embodiments, a "user" as used herein is an associate, an agent, a specialist, an account manager, a teller, or the like associated with the entity. In other embodiments, the user may not be associated with the entity and instead may be associated with a third party entity, such as a third party document processing firm, or the like.

In some embodiments, a "customer" as used herein is a corporation, a company, a partnership, a small business, an individual, or the like. These terms are used interchangeably throughout and may refer to one another.

The present invention is directed to a commercial card packet form system—a software-based system that enables the user to input information into a commercial card packet form associated with a customer to whom a card (e.g., a commercial card, a purchase card, a travel card, a debit card, a credit card, a temporary card, a mobile wallet token, or the like) is being issued. Each user is granted or denied access to particular fields of information on the commercial card packet form depending on his role at the financial institution. The packet form system may require reentry of inputted information or user authentication to ensure accuracy of information. Pop-up warnings or alert windows alert the one or more users of potentially incomplete fields of information and instruct the one or more users to provide additional information. An audit trail tracks updates to information and includes a timestamp and details associated with the user who made the updates.

The commercial card packet form system of the present invention addresses an identified problem in the commercial card issuance process. Specifically, with multiple users being enabled to input and/or modify information associated with issuing the card to the customer, discrepancies in information (e.g., inconsistency, incompleteness, or omittance of information) typically required for issuing the card to customer are problematic and slow down the card issuance process. Further, there is no current way to track made changes to the information. The present invention addresses these identified problems not only by providing a system for locking information based on user type and requiring user authentication to access particular information fields, but also by providing a system for generating an audit trail that enables a user to view made changes to the information, as well as details associated with the user who is responsible for making the changes.

The commercial card packet form system of the present invention provides many benefits. First, the system provides a solution for increasing accuracy of inputted information associated with a customer to whom a card is being issued. Thus, the system reduces the amount of time required for reviewing, revising, and updating missing, incorrect, or incomplete information. Additionally, the system eliminates discrepancies in inputted information by locking and unlocking access on a per-user basis and by categorizing information as mandatory for completion and issuance of the card to the customer. All in all, the system reduces financial loss to a financial institution and enables the financial institution to provide a substantially higher level of customer service to the customer during card issuance.

Figure 1:
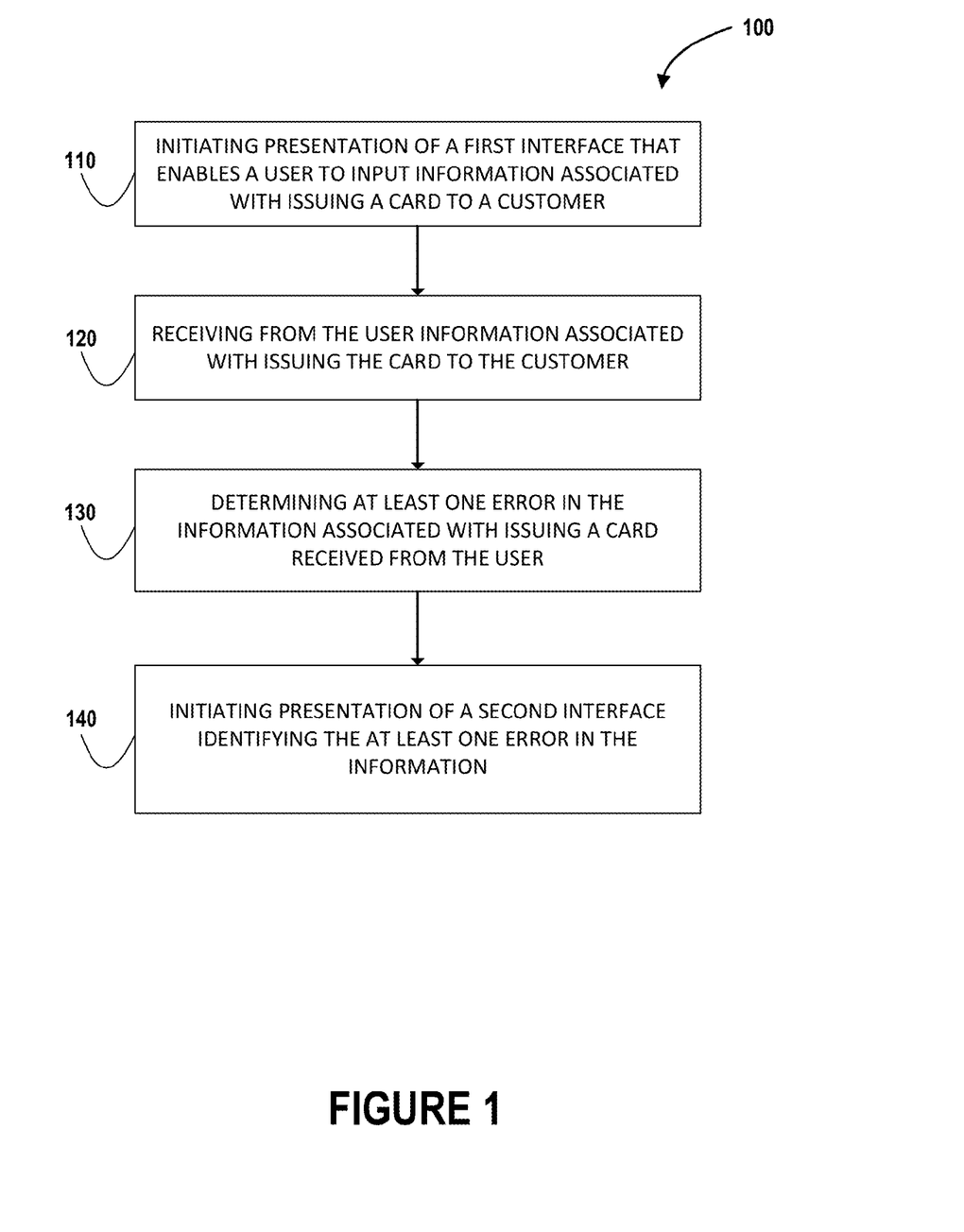
FIG. 1 is an exemplary process flow 100 for implementing a commercial card packet form system, in accordance with embodiments of the present invention.

Referring now to the Figures, FIG. 1 illustrates an exemplary process flow 100 for implementing a commercial card packet form system. At block 110, the process includes initiating presentation of a first interface that enables a user (e.g., a financial institution employee) to input information associated with issuing a card (e.g., a card associated with a commercial account) to a customer. At block 120, the process includes receiving from the user information associated with issuing the card to the customer. At block 130, the process includes determining at least one error in the information associated with issuing a card received from the user. At block 140, the process includes initiating presentation of a second interface identifying the at least one error in the information received.

Figure 2:
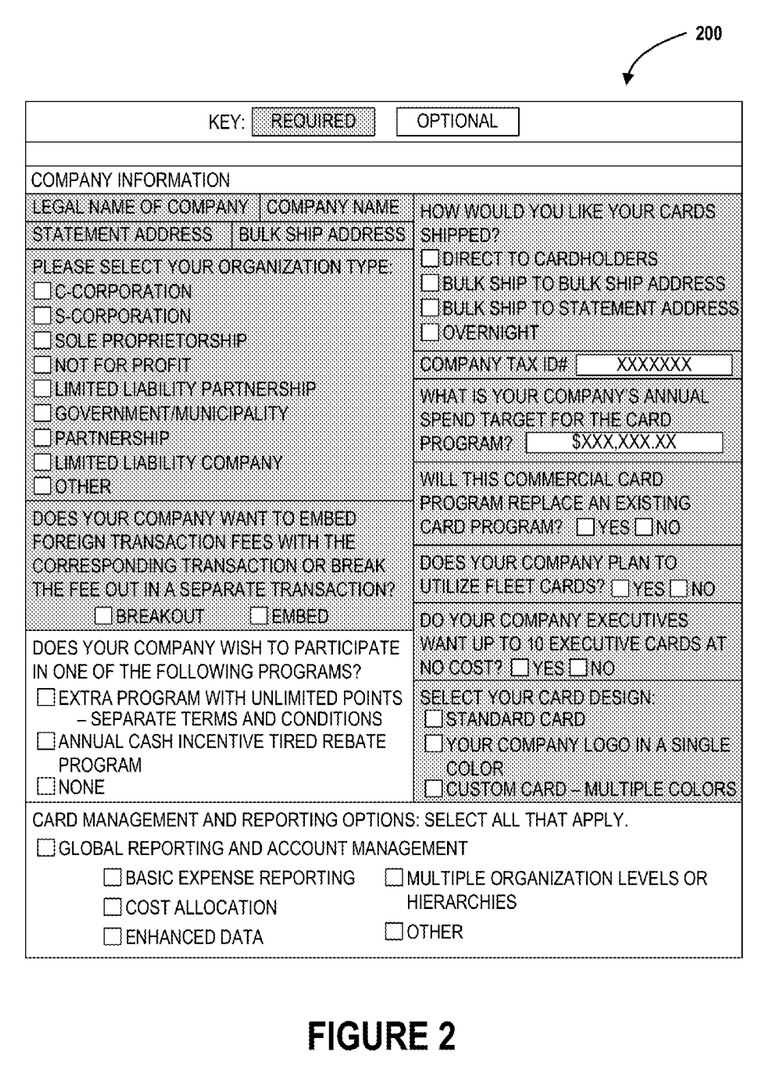
FIG. 2 is an exemplary user interface 200 for enabling a user to input information associated with issuing a card to a customer, in accordance with embodiments of the present invention.

FIG. 2 illustrates an exemplary user interface 200 for enabling the user to input information associated with issuing the card to a customer into a commercial card packet form system. The interface 200, or form, includes a plurality of information fields (e.g., text boxes, selection menus, graphs, or the like) configured to receive inputted information from the user. Information is typically inputted into the form by the user via an input device (e.g., a computing device, a workstation, a mobile device, or the like). In addition, the form is typically displayed (e.g., presented) on the input device. The system and its associated form 200 may be integrated with an existing digital platform associated with the entity, or may exist as a standalone software application.

The form 200 typically includes a plurality of information fields associated with issuing the card to the customer. Information associated with issuing the card to the customer may include but is not limited to a customer name, a customer address, a company name, contact information, a company address, an organization type, a preferred shipment method, bulk shipping options, a bulk ship address, an annual spend target, a preferred card design, a spending limit, an approved credit line, or a risk rating. The form 200 also includes information fields that enable the user to select options associated with card issuance, such as whether or not the to-be-issued card is replacing an existing card program associated with the entity, whether or not the customer wants to embed foreign transaction premium with a corresponding transaction or break the premium out into a separate transaction, whether or not the customer plans to utilize fleet cards (e.g., cards assigned to a vehicle or driver), whether or not the customer wants up to ten (10) executive cards at no cost, whether or not the customer wants to participate in a third party rewards program that earns unlimited points when the customer uses the card, whether or not the customer wants to enroll in an annual cash incentive tiered rewards program, card management and reporting options, or the like.

In some embodiments, one or more information fields on the form 200 are required for issuing the card to the customer. A required information field typically denotes a piece of information that is necessary for issuing the card to the customer, such as a customer name, a customer address, an account number, or the like. As seen in FIG. 2, a color-coding system denotes to the active user which information fields are required and which information fields are not required for issuing the card to the customer. A key or legend on the form 200 communicates to the user which colors designate required information fields and non-required information fields. For example, a shaded information field may denote that the information field is required, while a non-shaded (e.g., white) information field may denote that the information is not required, as seen in FIG. 2.

In other embodiments, one or more information fields on the form 200 are mandatory for issuing the card to the customer. For example, when the user inputs information into an information field that is mandatory, the user may be required to input information correctly into the mandatory information field before the system enables the user to progress and input another piece of information.

The system is configured to determine a user type associated with the user. Typically multiple user types are enabled to utilize the system, but other user types may also be enabled to utilize the system. Each user type typically has a unique purpose for utilizing the system. For example, a first user type is responsible for inputting information associated with the customer (e.g., contact information, account information, or the like), while a second user type is responsible for inputting information associated with issuing the card (e.g., card quantities, card design, or the like), and while a third user type is responsible for reviewing and monitoring the information for accuracy.

The user may be prompted by the system to input a user type or select a user type via the first interface. Alternatively, the system may be configured to determine the user type automatically. Determining a user type generally includes receiving login information from the user (e.g., receiving a username and/or password), comparing the received login information to a plurality of known login credentials, wherein each login credential is associated with a user type, determining a match between the received login information and at least one known login credential, and identifying a user type associated with the at least one known login credential.

Particular information fields may be accessed, displayed, viewed, updated, edited, modified, or the like by particular user types only. For example, only a user with a certain user type may be allowed to input information into information fields associated with customer contact information. Alternatively, particular information fields may be locked, hidden, or the like based on determination of the user type associated with the user.

The user inputs information associated with issuing the card to the customer at described above into one or more information fields on the form 200, and the system receives the inputted information. When the system receives information associated with issuing the card to the customer (e.g., substantially simultaneously to receiving information, in real time, in near real time, or the like), the system is configured to process the received information. Processing the received information may include a variety of steps as outlined below.

Processing the received information includes determining at least one error in the received information associated with issuing the card to the customer. The system analyzes the received information in each information field for accuracy and completeness. In some embodiments, analyzing the received information includes comparing the received information to a plurality of stored information known to be correct or incorrect (e.g., information that has been previously inputted into or that currently populates the first interface 200), determining a match between the received information and stored information, and then determining whether the received information is accurate, complete, incomplete, incorrect, missing, or the like. Based on this analysis, the system is configured to determine and/or identify at least one error in the received information associated with issuing the card to the customer. The error may include but is not limited to a spelling mistake, missing information, incomplete information, numerical value outside of a predetermined accepted range, an inconsistency of information, or the like.

Figure 3:
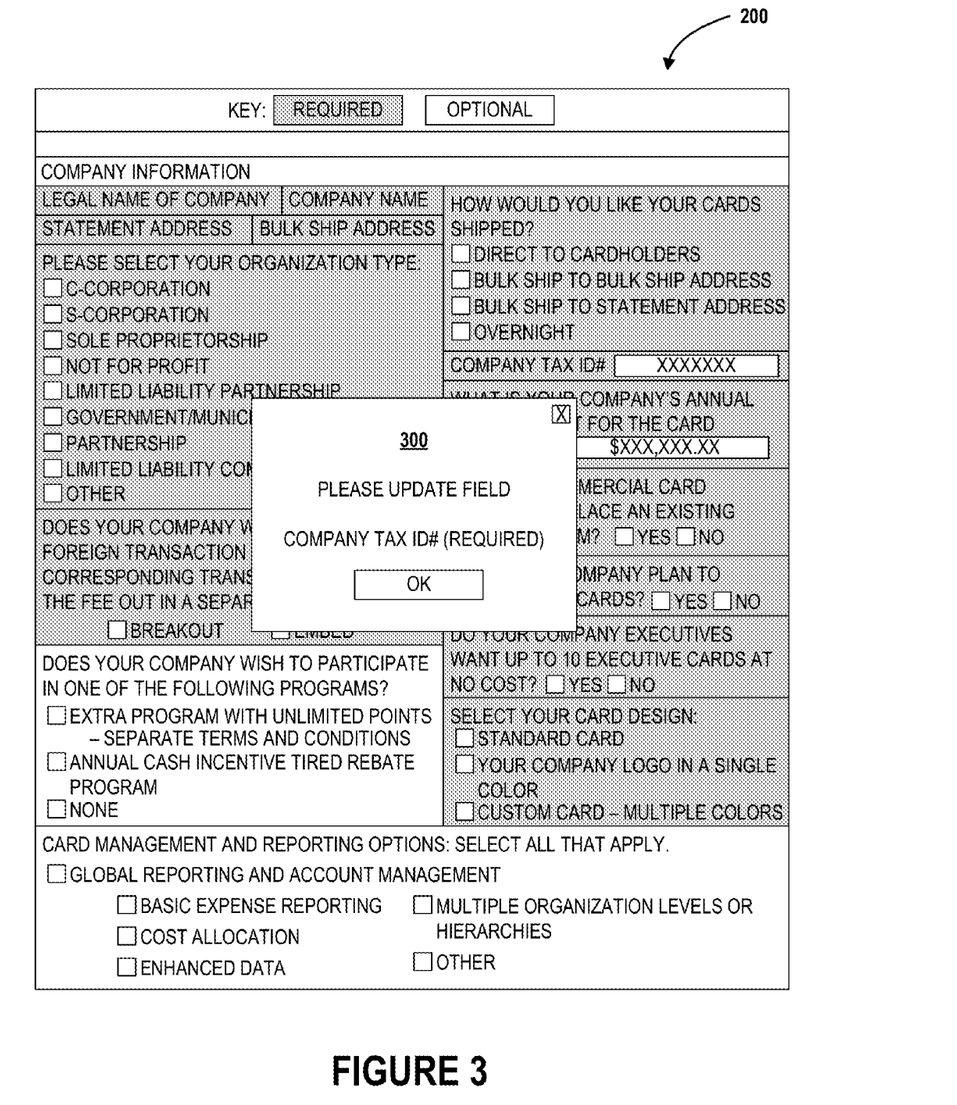
FIG. 3 is an exemplary user interface 300 for a pop-up window identifying an error in information associated with issuing a card to a customer, in accordance with embodiments of the present invention.

The system is configured to prompt the user with a second interface 300 (e.g., a pop-up window, a warning, an alert, a notification, or the like) at various times throughout the information input and processing processes. The second interface 300, or pop-up window, is typically generated and presented to the user in response to the system determining that there is an error in the received information associated with issuing the card to the customer. The pop-up window may also be generated and presented to the user when user authentication is required, when confirmation or reentry of information is required, or the like. Multiple pop-up windows 300 may be deployed by the system.

The pop-up window 300 may include a notification that an error has been identified, and prompts the user with instructions to correct the error or suggestions for correcting the error. For example, the pop-up window 300 may be presented to the user when an information field required for issuing the card to the customer has been mistakenly omitted by the user. The pop-up window 300 typically includes the at least one identified error and may also include means for locating and/or correcting the at least one identified error. In some embodiments, the at least one identified error may be associated with a required and/or mandatory piece of information for further input or processing of information associated with issuing the card to the customer, and therefore the user may be required to address (e.g., correct, modify, delete, complete, or the like) the at least one identified error immediately. In this regard, the user may be prevented from closing the form until the error has been adequately addressed. In other embodiments, the user may address the at least one identified error at a later time.

In some embodiments, the user is required to provide an authentication credential to the system in order to view, modify, delete, or add information in a particular information field that is locked, required, mandatory, restricted to a particular user type, confidential, or the like. Authentication may also be required by the system at various other times during operation of the system. The system prompts typically the user via the second interface 300 for at least one authentication credential (e.g., a password, a passcode, a personal identification number (PIN), an answer to a security question, a biometric input, readable indicia, a gesture, a user input, or the like). The system receives the at least one authentication credential and compares the received at least one authentication credential to a plurality of authentication credentials associated with authentication of the user. The system determines at least a partial match between the at least one authentication credential and the plurality of authentication credentials associated with authentication. Based on determining a match, the system authenticates the user and enables the user to access, view, modify, delete, or add information associated with issuing the card to the customer. If no match is determined between the at least one authentication credential and the plurality of authentication credentials associated with authentication of the user, the system may prompt the user for another authentication credential or deny the user from execution of an action (e.g., accessing or modifying information).

In other embodiments, the pop-up window 300 prompts the user to reenter or confirm critical information associated with issuing the card to the customer. For example, the system may initiate presentation of the pop-up window 300 asking the user to confirm an approved credit line amount, which is a number critical to issuance of the card to the customer.

After the user completes the inputting of information associated with issuing the card to the customer and addressing any identified errors, the system is configured to save, store, or back up the information associated with issuing the card to the customer in a database.

Typically, the system is further configured to generate an audit trail based on the information associated with issuing the card to the customer and store this audit trail in a database. The purpose of generating an audit trail is to easily track all changes to information made by the users. The audit trail typically includes at least one of a timestamp, a datestamp, a name and user ID of the user that made changes, information associated with the user, an identified error in the information associated with issuing the card to customer, or an identified change made to the information associated with issuing the card to the customer. The audit trail enables the user (or a second user, such as an administrator) to monitor any changes or updates to information associated with issuing the card to the customer. The system of the present invention drastically reduces the amount of time required for monitoring and revising information associated with issuing the card to the customer.

The system is further configured to generate a report for review. The report typically includes at least one of information associated with issuing the card to the customer, the audit trail, or information associated with the user. The report embodies at least one of a message, an email, a notification, a workbook, or a document and may be transmitted to a second apparatus associated with a second user (e.g., an administrator, a records specialist, or the like) for review and/or documentation.

The system may further process the information associated with issuing the card to the customer. The system may also be configured to issue the card to the customer. The system may associate a newly-issued card with a financial account associated with the customer. The customer may then utilize the card for payment of commercial (or non-commercial) purchases.

Figure 4:
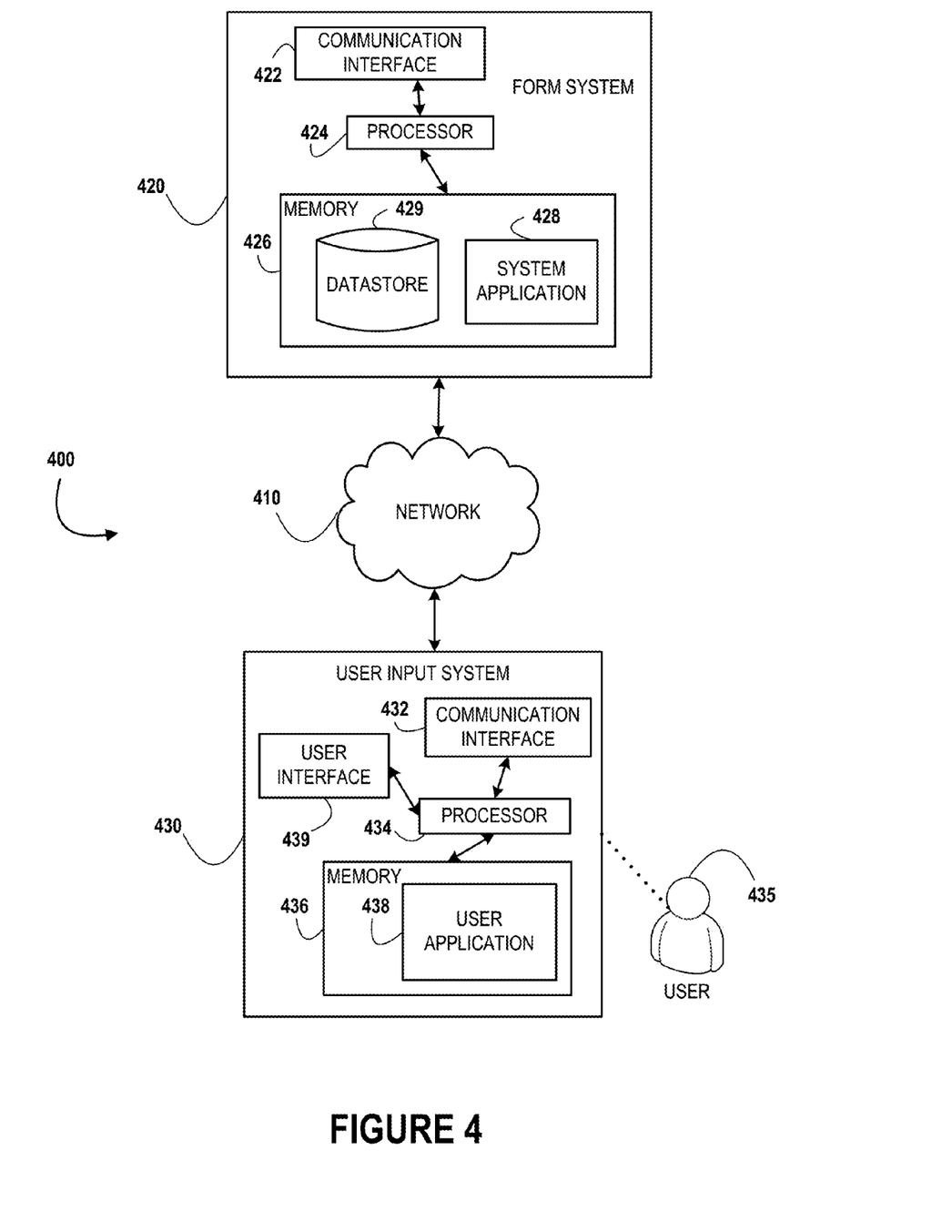
FIG. 4 is an exemplary system environment 400 for executing functions associated with a commercial card packet form system, in accordance with embodiments of the present invention.

FIG. 4 is an exemplary block diagram illustrating technical components of a system 400 for a commercial card packet form system as described in the process flow 100 and as described in FIG. 1, as well as the exemplary interfaces 200, 300 as illustrated in FIGS. 2-3. As illustrated, the system environment 400 includes a network 410, a form system 420, and a user input system 430.

As shown in FIG. 4, the form system 420 and the user input system 430 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 is secure and may also include wireless and/or wireline and/or optical interconnection technology.

FIG. 4 also illustrates a form system 420, in accordance with an embodiment of the present invention. The form system 420 may refer to the "apparatus" or "system" described herein. The form system 420 may include any computerized apparatus that can be configured to perform any one or more of the functions of the form system 420 described and/or contemplated herein. In accordance with some embodiments, for example, the form system 420 may include a computer network, an engine, a platform, a server, a database system, a front end system, a back end system, a personal computer system, and/or the like. Therefore, the form system 420 may be a server managed by the entity. The form system 420 may be located at the facility associated with the entity or remotely from the facility associated with the entity. In some embodiments, such as the one illustrated in FIG. 4, the form system 420 includes a communication interface 422, a processor 424, and a memory 426, which includes a system application 428 and a datastore 429 stored therein. As shown, the communication interface 422 is operatively and selectively connected to the processor 424, which is operatively and selectively connected to the memory 426.

It will be understood that the system application 428 may be configured to implement any one or more portions of the various user interfaces and/or process flow described herein. Specifically, the system application 428 may execute the process flow described in FIG. 1. The system application 428 may interact with the user application 438. For example, the system application 428 may initiate presentation of a form on a user interface 439 or receive information or commands from the user interface 439 via the user application 438. It will also be understood that, in some embodiments, the memory includes other applications. It will also be understood that, in some embodiments, the system application 428 is configured to communicate with the datastore 429, the user input system 430, or the like.

It will be further understood that, in some embodiments, the system application 428 includes computer-executable program code portions for instructing the processor 424 to perform any one or more of the functions of the system application 428 described and/or contemplated herein. In some embodiments, the system application 428 may include and/or use one or more network and/or system communication protocols.

In addition to the system application 428, the memory 426 also includes the datastore 429. As used herein, the datastore 429 may be one or more distinct and/or remote datastores. In some embodiments, the datastore 429 is not located within the form system 420 and is instead located remotely from the form system 420. In some embodiments, the datastore 429 stores information or data described herein.

It will be understood that the datastore 429 may include any one or more storage devices, including, but not limited to, datastores, databases, repositories, and/or any of the other storage devices typically associated with a computer system. It will also be understood that the datastore 429 may store information in any known way, such as, for example, by using one or more computer codes and/or languages, alphanumeric character strings, data sets, figures, tables, charts, links, documents, and/or the like. Further, in some embodiments, the datastore 429 may include information associated with one or more applications, such as, for example, the system application 428, information associated with a customer or a customer's financial account or another type of account, or documents associated with a card application form or information input forms, or the like. It will also be understood that, in some embodiments, the datastore 429 provides a substantially real-time representation of the information stored therein, so that, for example, when the processor 424 accesses the datastore 429, the information stored therein is current or substantially current.

It will be understood that the embodiment of the system environment 400 illustrated in FIG. 4 is exemplary and that other embodiments may vary. As another example, in some embodiments, the form system 420 includes more, less, or different components. As another example, in some embodiments, some or all of the portions of the system environment 400 may be combined into a single portion. Likewise, in some embodiments, some or all of the portions of the form system 420 may be separated into two or more distinct portions.

In addition, the various portions of the system environment 400 may be maintained for and/or by the same or separate parties. It will also be understood that the form system 420 may include and/or implement any embodiment of the present invention described and/or contemplated herein. For example, in some embodiments, the form system 420 is configured to implement any one or more of the embodiments of the process flows described and/or contemplated herein in connection any process flow described herein. Additionally, the form system 420 or the user input system 430 is configured to initiate presentation of any of the user interfaces described herein.

The user input system 430 may include any computerized apparatus that can be configured to perform any one or more of the functions of the user input system 430 described and/or contemplated herein. For example, the user 435 may use the user input system 430 to transmit and/or receive information or commands to and from the system 420. In some embodiments, for example, the user input system 430 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 4, in accordance with some embodiments of the present invention, the user input system 430 includes a communication interface 432, a processor 434, a memory 436 having a user application 438 stored therein, and a user interface 439. In such embodiments, the communication interface 432 is operatively and selectively connected to the processor 434, which is operatively and selectively connected to the user interface 439 and the memory 436. In some embodiments, the user 435 may use the user application 438 to execute processes described with respect to the process flow and interfaces described herein.

Each communication interface described herein, including the communication interface 432, generally includes hardware, and, in some instances, software, that enables the user input system 430, to transport, send, receive, and/or otherwise communicate information to and/or from the communication interface of one or more other systems on the network 410. For example, the communication interface 432 of the user input system 430 may include a wireless transceiver, modem, server, electrical connection, and/or other electronic device that operatively connects the user input system 430 to another system such as the form system 420. The wireless transceiver may include a radio circuit to enable wireless transmission and reception of information. Each processor described herein, including the processor 434, generally includes circuitry for implementing the audio, visual, and/or logic functions of the user input system 430. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 438 of the memory 436 of the user input system 430.

Each memory device described herein, including the memory 436 for storing the user application 438 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the form system 420 or the user input system 430 in which it resides to implement the functions of the form system 420 or the user input system 430.

As shown in FIG. 4, the memory 436 includes the user application 438. In some embodiments, the user application 438 includes an interface for communicating with, navigating, controlling, configuring, and/or using the user input system 430. In some embodiments, the user application 438 includes computer-executable program code portions for instructing the processor 434 to perform one or more of the functions of the user application 438 described and/or contemplated herein. In some embodiments, the user application 438 may include and/or use one or more network and/or system communication protocols.

Also shown in FIG. 4 is the user interface 439. In some embodiments, the user interface 439 includes one or more output devices, such as a display and/or speaker, for presenting information to the user 435. In some embodiments, the user interface 439 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 435. In some embodiments, the user interface 439 includes the input and display devices of a mobile device, which are operable to receive and display information.

Also shown in FIG. 4 is a user 435 of the user input system 430. The user input system 430 may be any computing device. The user 435 may be a person who uses the user input system 430 to execute a user application 438. The user application 438 may be an application to communicate with the form system 420, perform a transaction, input information onto a user interface presented on the user input system 430, receive and/or transmit information, the like. The user application 438 and/or the system application 428 may incorporate one or more parts of any process flow described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system to enable a user to input information associated with a card being issued, the system comprising:
 a memory;
 at least one processor; and
 a module stored in memory and comprising instruction code that is executable by the at least one processor and configured to cause the at least one processor to:
  initiate presentation of a first interface on a user device that enables a user to input information associated with issuing a card to a customer, wherein the first interface comprises a form comprising a plurality of information fields, wherein receiving the information from the user device comprises populating the plurality of information fields with the information received from the user device, wherein the plurality of information fields include at least one information field that is not accessible by the user based on a determination of a user type associated with the user;
  receive from the user device information associated with issuing the card to the customer;
  determine at least one error in the information in one or more fields associated with issuing a card received from the user device, wherein the at least one error comprises incomplete information;
  initiate presentation of a second interface identifying the at least one error in the information on the user device;
  prompt, via the second interface, the user for at least one authentication credential to access;
  receive from the user device at least one authentication credential;
  compare the at least one authentication credential received from the user device to a plurality of authentication credentials stored in a database and associated with authentication of the user; and
  determine at least a partial match between the at least one authentication credential received from the user device and an authentication credential in the plurality of authentication credentials associated with authentication of the user, wherein the user is enabled to input additional information to complete the information associated with issuing the card to the customer in response to being authenticated.

2. The system of claim 1, wherein information associated with issuing the card to the customer comprises at least one of a customer name, a customer address, a company name, a company address, an organization type, a preferred shipment method, an annual spend target, a preferred card design, a spending limit, an approved credit line, or a risk rating.

3. The system of claim 1, wherein the card comprises at least one of a commercial card, a purchase card, or a debit card, a credit card, wherein the card is associated with a financial account.

4. The system of claim 1, wherein the at least one error comprises at least one of a spelling error, missing information, incomplete information, a numerical value outside of a predetermined range, or an inconsistency of information.

5. The system of claim 1, wherein determining the at least one error comprises:
 comparing the information received from the user device to information previously inputted into the first interface; and
 determining that the information received from the user device does not match information previously inputted into the first interface.

6. The system of claim 1, wherein the second interface enables the user to input information associated with issuing the card to the customer.

7. The system of claim 6, wherein the module is further configured to generate an audit trail, wherein the audit trail includes at least one of a timestamp, a datestamp, a user name, a user identification (ID), information associated with the user, an identified error in the information associated with issuing the card to customer, or an identified change made to the information associated with issuing the card to the customer.

8. The system of claim 7, wherein the module is further configured to generate a report, wherein the report includes at least one of information associated with issuing the card to the customer, the audit trail, or information associated with the user, wherein the report is at least one of a message, an email, a notification, a workbook, or a document.

9. The system of claim 8, wherein the module is further configured to transmit the report to at least one apparatus associated with at least one second user.

10. The system of claim 1, wherein the module is further configured to back up the information associated with issuing the card to the customer by storing the information associated with issuing the card to the customer in a database.

11. The system of claim 1, wherein the user is prompted by the module and is required to input information associated with issuing the card to the customer twice, wherein twice-input information includes a first input of information and a confirmation of the first input of information.

12. The system of claim 1, wherein the module is further configured to provide suggestions to the user via the second interface for correcting the identified at least one error.

13. A computer program product comprising a non-transitory computer-readable medium comprising code causing an apparatus to:
- initiate presentation of a first interface on a user device that enables a user to input information associated with issuing a card to a customer, wherein the first interface comprises a form comprising a plurality of information fields, wherein receiving the information from the user device comprises populating the plurality of information fields with the information received from the user device, wherein the plurality of information fields include at least one information field that is not accessible by the user based on a determination of a user type associated with the user;
- receive from the user device information associated with issuing the card to the customer;
- determine at least one error in the information in one or more fields associated with issuing a card received from the user device, wherein the at least one error comprises incomplete information;
- initiate presentation of a second interface identifying the at least one error in the information on the user device;
- prompt, via the second interface, the user for at least one authentication credential to access;
- receive from the user device at least one authentication credential;
- compare the at least one authentication credential received from the user device to a plurality of authentication credentials stored in a database and associated with authentication of the user; and
- determine at least a partial match between the at least one authentication credential received from the user device and an authentication credential in the plurality of authentication credentials associated with authentication of the user, wherein the user is enabled to input additional information to complete the information associated with issuing the card to the customer in response to being authenticated.

14. The computer program product of claim 13, wherein the code further causes the apparatus to generate an audit trail, wherein the audit trail includes at least one of a timestamp, a datestamp, a user name, a user identification (ID), information associated with the user, an identified error in the information associated with issuing the card to customer, or an identified change made to the information associated with issuing the card to the customer.

15. A method comprising:
- initiating, via a computing device processor, presentation of a first interface on a user device that enables a user to input information associated with issuing a card to a customer, wherein the first interface comprises a form comprising a plurality of information fields, wherein receiving the information from the user device comprises populating the plurality of information fields with the information received from the user device, wherein the plurality of information fields include at least one information field that is not accessible by the user based on a determination of a user type associated with the user;
- receiving, via a computing device processor, from the user device information associated with issuing the card to the customer;
- determining, via a computing device processor, at least one error in the information in one or more fields associated with issuing a card received from the user device, wherein the at least one error comprises incomplete information;
- initiating, via a computing device processor, presentation of a second interface identifying the at least one error in the information on the user device;
- prompting, via the second interface, the user for at least one authentication credential to access;
- receiving, via a computing device processor, from the user device at least one authentication credential;
- comparing, via a computing device processor, the at least one authentication credential received from the user device to a plurality of authentication credentials stored in a database and associated with authentication of the user; and
- determining, via a computing device processor, at least a partial match between the at least one authentication credential received from the user device and an authentication credential in the plurality of authentication credentials associated with authentication of the user, wherein the user is enabled to input additional information to complete the information associated with issuing the card to the customer in response to being authenticated.

16. The method of claim 15, wherein the method further comprises generating an audit trail, wherein the audit trail includes at least one of a timestamp, a datestamp, a user name, a user identification (ID), information associated with the user, an identified error in the information associated with issuing the card to customer, or an identified change made to the information associated with issuing the card to the customer.

* * * * *